Figure 1:
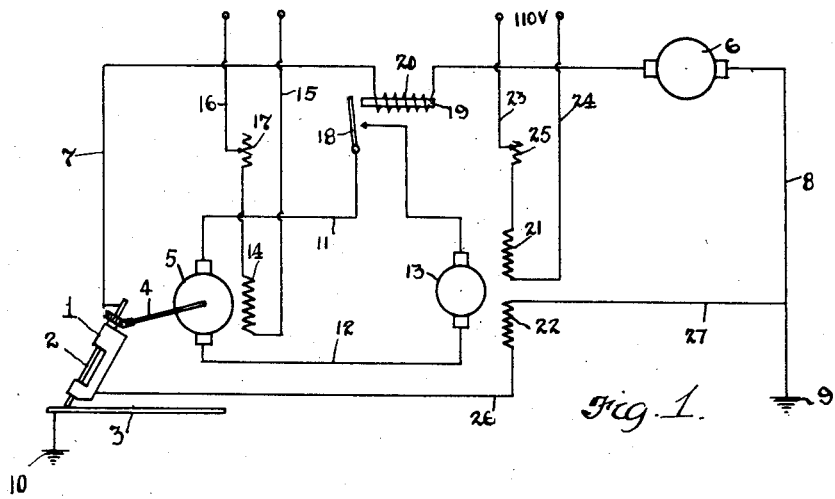

Jan. 29, 1935. E. CHAPMAN 1,989,546
APPARATUS FOR ELECTRIC WELDING
Filed July 8, 1930 2 Sheets-Sheet 1

INVENTOR.
Everett Chapman
BY
Fay, Oberlin & Fay
ATTORNEYS.

Jan. 29, 1935.  E. CHAPMAN  1,989,546
APPARATUS FOR ELECTRIC WELDING
Filed July 8, 1930  2 Sheets-Sheet 2
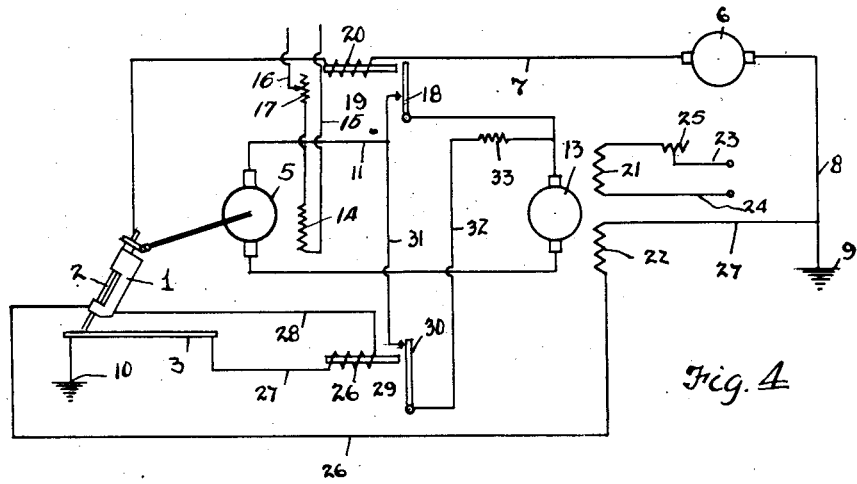
Fig. 4
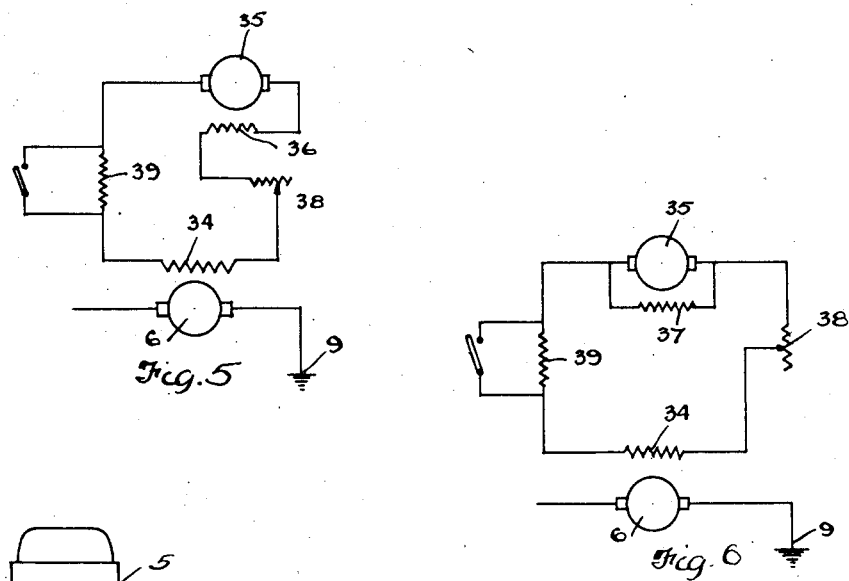
Fig. 5
Fig. 6
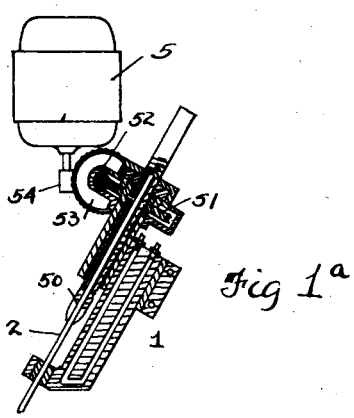
Fig. 1a
INVENTOR.
Everett Chapman
BY
Fay, Oberlin & Fay
ATTORNEYS.

Patented Jan. 29, 1935

1,989,546

UNITED STATES PATENT OFFICE 1,989,546

APPARATUS FOR ELECTRIC WELDING

Everett Chapman, Coatesville, Pa., assignor to The Lincoln Electric Company, Cleveland, Ohio, a corporation of Ohio Application July 8, 1930, Serial No. 466,463

2 Claims. (Cl. 219—8)

This invention, relating as indicated to methods of and apparatus for electric welding and the like, has more particular reference to apparatus designed for the purpose of maintaining constant the length of the welding arc as struck between the welding electrode, whether carbon or metallic, and the work to be welded, and further to establish such arc preliminary to the movement of the welding electrode along the seam to be welded, or during such movement after a disruption of the arc due to any causes which commonly cause the arc to be extinguished.

All methods of controlling the arc length and striking the arc preparatory to the welding operation or during such operation after the arc has been disrupted, have been carried on by mechanism and apparatus which relies upon certain mechanical movements for the purpose of striking the arc and regulating the length thereof, which mechanical movements are interposed between a prime mover and the means by which the electrode is supported. These mechanisms for accomplishing the methods of arc control now commonly employed in the art of arc welding have been decidedly unsatisfactory due to their complexity of construction which necessarily increases the cost of manufacture as well as the maladjustment of the operating mechanism during its use, resulting in the failure of such mechanism in accomplishing the method for which they have been designed. Any mechanism which operates on mechanical principles, such as the interengagement of oppositely moving parts for the purpose of maintaining proper arc length are, due to their necessary complexity of construction, inadequate for sensitive control of the electrode to maintain the arc struck thereby at a practically constant value.

With any mechanism designed for the purpose of arc control, there must be associated some means for interrupting the welding circuit after the completion of a single welding operation. Heretofore elaborate means have been designed for the purpose of disrupting or breaking the welding circuit so that the heavy current to be interrupted would not cause a damage to the interrupting mechanism. A welding arc control means, in order to function efficiently without a rapid deterioration thereof should be provided with a simple means whereby any of the circuits may be broken at any time without subjecting such disrupting means to deterioration from the arc resulting from such disruption. It is among the objects of my invention to provide a welding arc control means which shall have all of the above named desirable characteristics and further to provide an arc welding circuit interrupting means which shall be more efficient and available at a lower cost than any means heretofore employed.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

Figure 2:
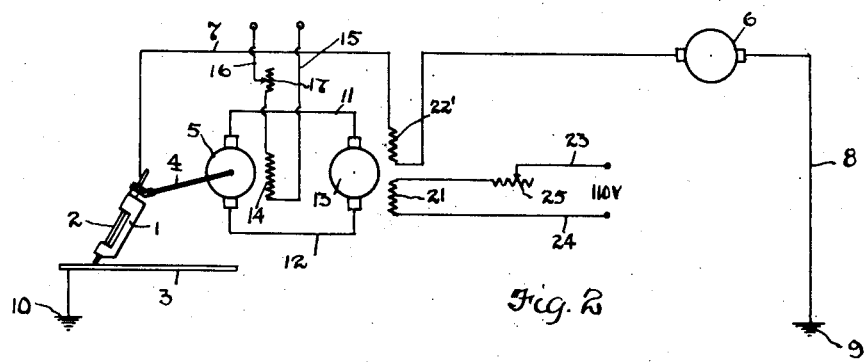
Figure 3:
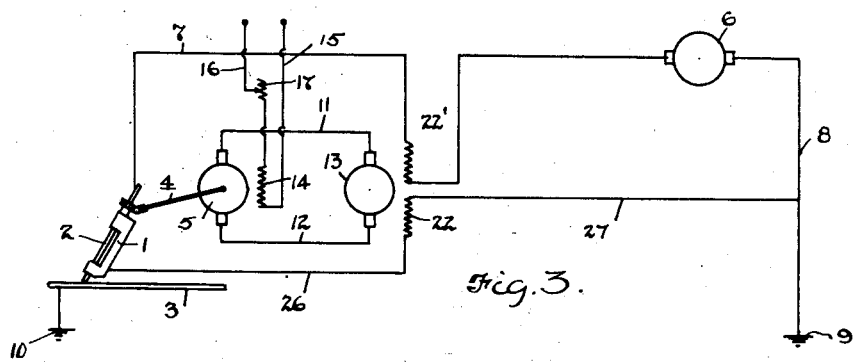

In said annexed drawings:

Fig. 1 is a diagrammatic representation of a welding electrode supported in relation to the work to be welded showing associated therewith the apparatus and wiring comprising one form of my invention; Fig. 1a is a part sectional part elevational view of apparatus which may be employed for moving the electrode holder; Fig. 2 is a diagrammatic representation of a circuit similar to that illustrated in Fig. 1, differing, however, in the application of a field coil in series with the welding circuit in contradistinction to the shunt coil shown in Fig. 1; Fig. 3 is a representation of a circuit wherein the field coils of one of the dynamo electric machines comprises coils producing electro-magnetic fields, respectively, responsive to the arc current and voltage; Fig. 4 is a diagrammatic representation of a circuit with associated mechanism designed for the purpose of controlling the length of the arc and to re-establish such arc, such apparatus being responsive to electrical characteristics of such arc; Fig. 5 is a diagrammatic representation of one form of the welding circuit interrupting means comprising my invention; and Fig. 6 is a representation of an alternative form of construction of the apparatus shown in Fig. 5.

Referring more specifically to the drawings and more especially to Fig. 1, I have here shown a holder 1 for a welding electrode 2 which may be either carbon or metallic, positioned in proper relation to the work 3 to be welded. The electrode holder 1 is shown mechanically connected as at 4 to a motor 5 which is employed through suitable gearing, as illustrated in Fig. 1a which, although not forming a part of this invention, may be described as consisting of an electrode engaging sleeve 50 slidably mounted in the holder 1 and in driving communication with the motor 5 through gears 51, 52, 53 and 54, for the purpose of raising and lowering the electrode 2, depending upon the rotation of the armature of such motor 5. It will be noted that by employing the form of gearing above described for interconnecting the motor 5 and the electrode sleeve 50, rotation of the armature motor 5 may move the electrode either away from or toward the work, whereas, upon rotation in the opposite direction of such armature, the electrode will be moved in the opposite direction. Welding current for the welding electrode 2 is supplied by means of a welding generator 6 which, through the lead 7, is connected to the electrode 2 and through lead 8 is grounded as at 9. The work 3 being likewise grounded as at 10, the welding circuit is complete.

Electrical energy for the armature of the motor 5 is supplied through leads 11 and 12 which are respectively connected to the opposite poles of a generator 13. The field excitation for the motor 5 is provided by a coil 14 which may be connected across a line of suitable potential by means of leads 15 and 16. A variable resistance 17 may be placed in series with the field coil 14 for the purpose of regulating the field excitation of the motor 5. The lead 11 interconnecting respective sides of the motor 5 and generator 13 has in series therewith a switch member 18 which is actuated by the armature 19 of a relay, the coil 20 of which is in series with the welding current lead 7 from the welding current generator 6 to the welding electrode 2. The field of the generator 13 consists of separate coils 21 and 22. Field coil 21 is connected across the line of constant potential by means of leads 23 and 24 and has a variable resistance 25 in series therewith. The leads 26 and 27 for the field coil 22 are respectively connected to the electrode holder 2 and the ground lead 8 so that the coil 22 is a potential coil reflecting the voltage of the welding arc struck between the electrode 2 and the work 3.

The operation of the above described device as illustrated in Fig. 1 is briefly as follows. After the arc has been established between the welding electrode 2 and the work 3, current will flow in the welding circuit specifically in lead 7 thereof, exciting coil 20 of the relay in series therewith which will cause the armature 19 to close the switch 18 in the circuit between the generator 13 and the motor 5. As hereinbefore stated, the motor 5 will rotate only when current is supplied thereto by the generator 13 and the current so supplied by the generator 13 is, of course, dependent upon the field excitation of this latter machine.

The coils 21 and 22 are so wound in the machine 13 as to buck each other, that is, when a certain electro-magnetic field is set up by the coil 22, the effect thereof may be entirely counteracted by an opposite field set up by the coil 21 which may be regulated or adjusted by the variable resistance 25 in series therewith. Therefore, by properly adjusting the variable resistance 25 a predetermined strength of the electro-magnetic field 21 will result which, unless the electro-magnetic field of the coil 22 is equal and opposite thereto, will cause a current to be generated by the generator 13, consequently driving the motor 5 in a predetermined direction. It will be seen from the above description that the current both as to magnitude and direction produced by the generator 13 is entirely dependent upon the voltage of the welding arc so that any deviation of the arc voltage from a predetermined value will be automatically corrected by the generator 13 sending the proper current in the proper direction through the motor 5 which will immediately move the holder 1 so as to correct the arc length and consequently the arc voltage.

As most clearly illustrated in Fig. 2, the arc current rather than the arc voltage may be the characteristic of the arc employed for the purpose of maintaining the proper arc between the electrode 2 and the work 3. In the form of construction illustrated in this figure, the coil 21 is employed in the manner illustrated in Fig. 1, whereas the coil 22 is in series with the welding circuit, so that the electro-magnetic field produced thereby is dependent upon the current flow in the welding circuit. The manner of operation of the several parts of the mechanism for the purpose of maintaining a constant arc is the same as that described in connection with Fig. 1, so that a recitation of such operation is believed unnecessary.

Instead of employing a coil such as coil 21 illustrated in Figs. 1 and 2, which is connected across a line of constant potential, it may be advisable to employ a coil in lieu thereof which is identically connected as the coil 22 in Fig. 1, so that a like reference numeral will be employed to designate this coil. In this arrangement the coil 22' is connected in the manner described in connection with the explanation of Fig. 2, so that a reference numeral similar to that used to designate such coil in Fig. 2 will be employed for the purpose of designating such coil in this figure. The obvious advantage of the arrangement of the coils as illustrated in Fig. 3 is that a more delicate control of the arc is possible than with either of the forms illustrated and described in connection with Figs. 1 and 2. The electro-magnetic field set up by the coil 22 is in proportion of the arc voltage and the electro-magnetic field generated by the coil 22' is in proportion to the current in the welding circuit. The coils 22 and 22' are wound differentially on the poles of the machine. As the electrode moves away from the work thereby lengthening the arc, the voltage of the arc will increase and the current flowing therethrough will decrease, so that the electro-magnetic fields, respectively, produced by coils 22 and 22', vary in opposite directions more quickly effecting a generation of current by the generator 13 so that the motor 5 will more quickly respond to correct the arc length than in either of the methods heretofore described in which a constant, non-varying electro-magnetic field was bucked against a varying field.

The above described circuits may be employed for the purpose of moving the electrode down into contact with the work to strike the arc preparatory to the welding operation or to reestablish the arc after the same has become disrupted during such welding operation. However, due to the sensitiveness of such circuits and the speed by which the electrode is moved to correct alterations in the arc length, such circuits and mechanism if employed alone would drive the electrode down into contact with the work with such force as to cause damage to either the electrode or the actuating and supporting mechanism. In order, therefore that the above described mechanism may be delicately responsible to variations in the arc characteristic and yet be employed for the purpose of striking the arc, means should be provided in association therewith which will change or vary the effectiveness of such corrective tendencies as the arc is disrupted between the electrode and the work. Such means for reducing the speed of adjustment or delicacy of adjustment for the purpose of striking the arc is shown in Fig. 4 in which, in addition to the apparatus and circuits illustrated and described in Fig. 1 there is employed a relay coil 26 which, by means of leads 27 and 28 is connected across the arc, i. e., respectively to the work 3 and the electrode holder 2. An armature 29 actuated by the relay coil 26 is employed for the purpose of actuating a switch 30 for connecting leads 31 and 32 which are in parallel with the switch 18 in the lead 11 between the generator 13 and the motor 5. A resistance 33 is in series with the lead 32 for the purpose hereinafter more fully explained. The operation of the device is illustrated in Fig. 4 which will be described as follows. Assuming that the electrode 2 is traveling along the work 3 and for some reason such as is well known to those familiar with the art of electric welding, the arc between the electrode 2 and the work 3 becomes disrupted. No current will, therefore, flow in the welding circuit, specifically in the lead 7, other than the small amount of current flowing through the relay coil 26 through the leads 27 and 28 which is, however, insufficient to energize the coil 20 so that the switch 18 will open the circuit in lead 11 between the generator 13 and the motor 5. When the arc is disrupted, the voltage across the terminals of the welding generator 6 increases by such an amount so that the voltage impressed on the coil 26 will cause sufficient current to flow therethrough to move the armature 29 which will close the switch 30 connecting the leads 31 and 32 which therefore establish a circuit through the resistance 33 between the generator 13 and the motor 5. The unbalanced condition existing between the electro-magnetic fields produced by the coils 21 and 22 due to the disruption of the welding arc will cause current to be generated by the generator 13 which, through the circuit above described will cause the motor 5 to drive the electrode down into communication with the work. By placing the resistance 33 in the circuit between the generator 13 and the motor 5, the motor 5 will be driven at a much slower speed than when such resistance is short-circuited by closing the switch 18 after the arc has been struck, so that such slow speed of the motor 5 will prevent any injury to the electrode or to the electrode-adjusting mechanism.

As above indicated, as soon as the arc is re-established current flowing in the welding circuit will energize the coil 20 which, through the armature 19 will close the switch 18, short-circuiting the resistance 33 so that again minute differences in the electro-magnetic strength of the fields generated by the coils 21 and 22 will cause a current to flow through the motor 5 which will afford a very delicate control of the arc length. When the arc is struck, the current flowing in coil 26 drops to a value sufficiently low to release the armature 30. The several parts of the mechanism and wiring scheme as illustrated in Fig. 4 which correspond to those elements already described in connection with Fig. 1, will be given reference numerals similar to those already described in order to simplify the description and more clearly point out the similar constructions of the two arrangements.

In connection with all of the above described forms of construction it should be noted that the generator 13 is at all times rotated at a constant speed by a suitable prime mover which, not forming a part of this invention, has been omitted for the purpose of clarifying the description and reducing the number of parts illustrated to a minimum.

In connection with the above described methods of and apparatus for arc control, occasion may arise when the welding circuit needs be disrupted while the relatively large welding current is flowing therethrough. The method of and apparatus for controlling the current in the welding circuit is most clearly illustrated in Figs. 5 and 6 in which the welding current generator 6 has the field 34 thereof excited by means of exciting the generator 35 which may have a series field 36 as illustrated in Fig. 5, or a shunt field 37 as illustrated in Fig. 6. A variable resistance 38 is placed in series with the exciting circuit so that the strength of the field produced by the coil 34 may be controlled. When the generator 6 is operating at full capacity, that is, when the inductive circuit through the field coil 34 is operating at maximum capacity or is operating under any load less than maximum capacity, the current through the coil 34 may be reduced to a minimum by placing in series therewith a resistance as 39 which may be equal to about one thousand (1000) ohms, so that the exciting current for the field 34 of the welding generator 6 is reduced to a minimum, thereby causing an almost entire destruction of the current generated by the armature of the generator 6 which small current may then easily be broken by an ordinary switch in series with the welding circuit.

Among the advantages of the arc control method and apparatus as above described is that as the arc voltage varies, for example, one volt either increasing or decreasing, such one volt change will effect a change in the current flow through one of the fields of the mechanism as illustrated in Figs. 1, 2 and 4 and both fields in the mechanism as illustrated in Fig. 3 so that the ultimate effect of such change as reflected in the current supplied to the motor 5 designed for the purpose of correcting the condition which caused such change is magnified many times, thereby increasing the sensitivity of the arc control apparatus. As above indicated, where extreme sensitivity is desired, the apparatus as illustrated and described in connection with Fig. 3, may be employed wherein the sensitivity is approximately twice that of the apparatus illustrated in Figs. 1, 2 and 4. The above described methods of and apparatus for effecting a sensitive control of the welding arc, it will be seen, has further advantages over any method and apparatus heretofore employed in that by the simple arrangement of the several circuits operating through simple electrical machines, the length of the arc may be actively controlled with an ease not possible with methods and apparatus heretofore employed.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In apparatus for electric arc welding, the combination of a welding electrode adapted to be presented in arcing relation to the work; electrode moving means, a reversible motor in driving communication with said moving means, a generator in driving communication with said motor, a resistance in the circuit between said motor and said generator, a short circuit shunt around said resistance, and an electromagnetic switch in said circuit, said switch functionally responsive to the voltage across the arc.

2. In apparatus for electric arc welding, the combination of a welding electrode, electrode moving means; an electric motor intergeared with said moving means; an electric current generator, the output of which is responsive to the voltage characteristic of the welding circuit, in driving communication with said motor; a resistance in the circuit between said motor and generator, a short circuit shunt around said resistance and switch means functionally responsive to the establishment and disruption of the welding arc in said shunt.

EVERETT CHAPMAN.